United States Patent Office 3,142,691
Patented July 28, 1964

3,142,691
PRODUCTION OF LIGHT-COLORED SULFONATED FATTY ACIDS AND FATTY ACID DERIVATIVES
Carl Wulff, Dusseldorf-Benrath, Werner Stein, Dusseldorf-Holthausen, Otto Koch, Hilden, Rhineland, and Herbert Weiss, Cologne-Deutz, Germany, assignors to Henkel & Cie. G.m.b.H., Dusseldorf-Holthausen, Germany, a German corporation
No Drawing. Filed May 15, 1962, Ser. No. 194,965
Claims priority, application Germany Feb. 2, 1962
12 Claims. (Cl. 260—400)

This invention relates to improvements in the production of light-colored sulfonated fatty acids and fatty acid derivatives. The invention more particularly relates to a process for bleaching dark-colored sulfonated fatty acids and sulfonated fatty acid derivatives, such as esters and nitriles, and to the products obtained by this process.

Sulfonates of fatty acids or their derivatives such as their esters or nitriles, constitute surface-active materials which are resistant to hard water and thus are of interest as detergents and wetting agents. These sulfonates, however, as are obtained by the sulfonation of the corresponding fatty acids or fatty acid derivatives, are not commercially utilizable due to their vary dark brownish-black color.

It is an object of this invention to convert these dark brownish-black sulfonation products into lighter colored commercially utilizable products. These and still further objects will become apparent from the following description:

In accordance with the invention it has surprisingly been found that these dark-colored sulfonation products may be lightened to form a commercially attractive product by treatment with oxyacids having a strong oxidizing effect, or salts or anhydrides of these oxyacids.

The alpha-sulfonated fatty acids to be processed according to the invention may be derived from any fatty acids having 6 to 28, and preferably 8 to 18 carbon atoms especially from the fatty acids obtained from natural fats of plants or land or marine animals. By the choice of the starting fats it is possible to extensively influence the properties of the sulfonates to be manufactured. In this manner products which are easily soluble, even at low temperatures of, for example 20–45° C., can be obtained from fats which contain preferably fatty acids having 10–14 carbon atoms per molecule of fatty acid, especially from the fats of the lauric acid group, which are particularly rich in fatty acids having 12 carbon atoms, whereas from other fats containing preferably fatty acids having 16–18 carbon atoms in the molecule, such as vegetable fats other than those mentioned above, tallow, or whale and fish oils, products are obtained which are not as readily soluble at low temperatures, but are entirely useable at temperatures ranging from 50 to 100° C. These fatty acids or their derivatives, especially their esters or nitriles, in which, aside from the hydrogen atom in the alpha position, no sulfonatable groups are to be present, such as double bonds or alcoholic hydroxyl groups, are sulfonated in a manner which is known per se.

Insofar as esters of sulfonated fatty acids are concerned among the products to be processed according to the invention, they can be made from the above-mentioned crude sulfonated fatty acids by esterification with an alcohol. It has proven, however, that brighter-colored products are usually obtained if the bleaching is performed on the sulfonation products of fatty acid esters. These esters can be derived from monovalent or polyvalent alcohols, especially from monovalent or trivalent alcohols which, like the fats used for the sulfonation, do not contain any alcoholic hydroxyl groups or other sulfonatable groups besides the alpha hydrogen. Where the fatty acid esters are produced with primary aliphatic alcohols, these alcohols may contain 1 to 20 carbon atoms in the molecule. Accordingly, the esters of fatty acids containing methyl, ethyl, propyl, butyl, hexyl, heptyl, octyl, and nonyl alcohols, for example, can be used. Fatty acid esters, which contain residues of still higher alcohols in the molecule may also be used. Some of the easily obtainable fatty acid esters with high fatty alcohols are the hydration products or sperm oil or of the oleyl oleate occurring in sperm oil, or natural or synthetic wax esters.

Various methods are known for the conversion of these fatty acids or their derivatives, especially their esters or nitriles, into sulfonic acids, and chlorosulfonic acid. Oleum and sulfur trioxide have been proposed as sulfonating agents to produce the alpha-sulfonic acids. Although the bleaching process of the invention is applicable for the treatment of all of these sulfonic acids, its use for the treatment of products which are obtained by sulfonating the starting fats with gaseous sulfur trioxide, preferably in excess, in the absence of solvents is of special technical interest.

Many fatty acids, especially those of natural origin, and the derivatives produced therefrom, often contain accompanying substances which, during the sulfonation, produce strongly colored decomposition products. Even though it is possible by the invention to bleach even these decomposition products, it is nevertheless recommended not to encumber the bleaching process with the decomposition products of accompanying substances which can easily be removed, prior to sulfonation, from the fatty acids or fats or from the fatty acid derivatives made from the latter. Some of these products which produce strongly colored impurities with the sulfonating agent are, for example, unsaturated fatty acids or fatty acid derivatives. Therefore, the fatty substances to be processed should be saturated as completely as possible, i.e., they should have iodine numbers lower than 5, and preferably lower than 2. It is preferable in the sulfonation of fatty acids, to start with distillates, and this is also recommended even in the case of fatty acid esters, providing the latter are capable of distillation under the technical conditions involved. In the case of products which, on account of a high boiling point or for other reasons, cannot be distilled without considerable technical expense, as in the case of triglycerides, for example, then it is recommended to first remove any impurities present in the material to be sulfonated. Thus, in the case of natural fats, such as natural triglycerides, materials such as proteins and mucins, should be removed in a manner known per set as for example, by deacidification and refinement of the oils. These fatty substances, too, are to be saturated as much as possible, so that their iodine number is less than 5 and preferably less than 2.

Sulfonation with gaseous sulfur trioxide is known per se and can be performed in any desired manner. It has proven expedient to pass a current of gas, preferably a current of air, containing sulfur trioxide, through the melted starting material which has not been thinned with solvents.

The bleaching process in accordance with the invention is excellently suited for treating sulfonation products obtained and/or modified according to copending applications Serial Nos. 194,838; 194,839; 194,840; 194,786; 194,998; 194,997; filled the same day herewith.

The acid sulfonation products of fatty acids or derivatives which are to be processed according to the invention generally contain excess sulfur trioxide, which may be present in an excess of 0.05 to 1 mol with reference to one mol of fatty acid radical to be sulfonated. Preferably the excess in this case ranges from 0.1 to 0.7, and particularly from 0.1 to 0.4 mol of sulfonating agent, especially sulfur trioxide.

The products to be bleached according to the invention also include sulfonated fatty acid esters which have been made by esterifying crude sulfonated fatty acid with monovalent or polyvalent alcohols. The esters thus produced also may contain excess sulfonating agent in the amounts stated above.

The bleaching according to the invention can be performed on the crude sulfonation products immediately following sulfonation, without any further preparation, even though it still contains excess sulfonating agent. It is also possible to perform any desired additional processing prior to the bleaching as, for example, for the purpose of removing excess sulfur trioxide. Crude sulfonation products, diluted to a greater or lesesr extent with water, can also be bleached according to the invention.

Among the substances to be used as bleaches according to the invention, are the various oxyacids of chlorine, such as hpyochlorous acid, chlorous acid, chloric acid and perchloric acid, strongly oxidizing oxyacids of sulfur, such as peroxymonosulfuric acid (Caro's acid) and peroxydisulfuric acid ($HO_3S$—O—O—$SO_3H$, also known as "persulfuric acid"), and strongly oxidizing inorganic oxyacids, such as permanganic acid and chromic acid.

These acids can be used as free acids or in the form of their salts or anhydrides. When using the salts, an excess of sulfonating agent is not essential, because the free sulfonic acid is capable, even in the absence of excess sulfonating agent of releasing the oxidizing acid from the salt, so that the bleaching action takes place.

Not all these acids or the acid anhydrides corresponding thereto are stable in the free state. In many cases they decompose, especially the free oxyacids of chlorine or the acid anhydrides corresponding thereto, and form, for example, chlorine dioxide. Chlorine dioxide, too, is to be considered as an acid anhydride in the sense of the invention, and it is entirely possible to bleach the sulfonation products by using chlorine dioxide which has previously been produced in any manner. The chlorine dioxide can, for example, be introduced as a gas or be added in solution in appropriate solvents.

The acids richest in oxygen are not always the most effective bleaches, and evidently hypochlorous acid is too unstable and perchloric acid too stable to produce optimum bleaching effects. Chloric acid and especially chlorous acid and salts of these acids have proven particularly usable if it is desired to bleach so intensely that not only will the blue component vanish in the Lovibond Tintometer, but also the red and yellow components will be greatly weakened.

The strongly oxidant oxyacids or their salts or anhydrides should be used in amounts equivalent in bleaching effect to 0.2 to 6%, and preferably 1 to 4% by weight of hydrogen peroxide. When calculating the equivalence, one must consider what amounts of bleaching oxygen can be yielded by the oxidants used in each case under the conditions of the reaction. While, for example, chlorine dioxide can make all of its oxygen available for bleaching, persulfuric acid or peroxydisulfuric acid yield only the actual active oxygen. Permanganic acid is reduced during the oxidation to manganese dioxide, and chromic acid is reduced to the salt of trivalent chromium.

When working the oxidants into the sulfonation products, the components must be mixed as intimately as possible. In the case of the often very viscose to pasty sulfonation products such as are obtained, for example, from the triglycerides, it is recommended to work the oxidants together with water into the viscous or pasty sulfonation products. This is especially necessary when the oxidants are used in aqueous solution or suspension. It is necessary to adjust the viscosity in order to make the same favorable for the mixing operation also when gaseous oxidants, such as chlorine dioxide, are used, or when the oxidants are worked in in solid form, especially in the case of solid sodium chloride. Therefore, the solid oxidants should be used in the most finely divided form possible, and their uniform distribution in the sulfonation products should be aided by a strong stirring action or other such measures.

The bleaching time varies with the starting material, the nature and quantity of the bleach, and the temperature, which in general should amount to at least 20° C. Short reaction times of, for example, 2 to 15 minutes are generally used at high temperatures of, for example, 70 to 90° C., while at lower temperatures of, for example 40 to 70° C., reaction times of 15 minutes to 5 hours are used. These times are to be considered only as general indications; the bleaching time can be shorter or longer and can range from 1 minute to 75 hours.

The optimum conditions within these ranges are often dependent upon the form in which the bleach is used. In the case of sodium chlorite, for example, it has been found that the conditions to be maintained for optimum bleaching with solid sodium chlorite are narrower than in the case of aqueous solutions or suspensions of sodium chlorite. For example, if a bleaching time of 60 to 90 minutes is used with 3% by weight of sodium chlorite, the quality of the bleach in the temperature range of about 40 to 60° C., is practically independent of whether solid sodium chlorite or an aqueous solution of same is used. But when operating at temperatures under 40 or over 60° C., the bleaching quality is clearly better when it is done in the presence of water. In this case, the amounts of water used are advantageously such that the solid bleach, if it were used as a solution or suspension in this water, would be in a 20 to 80% suspension or solution, and preferably in a 40 to 60% suspension or solution.

If the presence of any residual oxidants in the bleached product, or of reaction products formed by the oxidants during the bleaching operation, should be undesirable, they are destroyed or removed.

The bleached products of the process can be further processed if desired. For example, the bleached sulfo fatty acids can be esterified in a known manner with monovalent or polyvalent alcohols, in which case both the free sulfo fatty acids and their monosalts can be esterified. The above-mentioned monovalent or polyvalent alcohols can serve as esterifying component. If polyvalent alcohols are used, partial esters of polyvalent alcohols can also be made.

If the products after further processing are not already in the form of their salts, they can be transformed into their salts in a known manner, it being possible first to remove the excess sulfonating agents.

The following examples are given by way of illustration and not limitation:

EXAMPLES

The crude sulfonation products whose processing is described in the examples, were made from the fatty products named in each case, whose iodine number was in no case greater than 1, and usually was from 0.2 to 0.3, by the introduction of gaseous sulfur trioxide diluted in twenty times the amount of air, at 80° C. In the course of one hour, 1.3 mols of sulfur trioxide were put in per mol of fatty acid residue; then the reaction product was kept at 80° C. for 15 minutes and then cooled to room temperature.

The bleach was worked into this sulfonation product at room temperature. In an industrial performance of the bleaching products, it is not necessary to cool the sulfonation products before the addition of the bleach; on the contrary, the bleaches here described can be worked into the sulfonation product at the bleaching temperature without the need to fear undesired temperature rises.

The bleach (finely powdered if in the solid state) was thoroughly mixed with the sulfonation product and the mixture was heated for some time at the bleaching temperature. Then it was neutralized, usually with 10% caustic soda solution. The color values of the neutralized product were measured in a 4" cell in a Lovibond Tintometer. The concentration of the solutions being measured was adjusted to 5% by weight with reference to the crude acid sulfonation product.

Any variations from the conditions stated above are expressly mentioned in the examples.

Example 1

A sulfonation product made from the ethyl ester of a hydrated palm nut fatty acid (free $SO_3$ content approximately 7.8% by weight) was bleached for 90 minutes at 40° C. after the addition of 3% of its weight of $NaClO_2$ (in the form of a 40% aqueous solution; composition of the sulfuric acid prior to reaction with the bleach: 64% $SO_3$ and 36% $H_2O$, and, after reaction with the bleach: 59% $SO_3$ and 41% $H_2O$). The color values were: Yellow 3.5, red 0.9, blue 0.1.

Example 2

A sulfonation product made from the ethyl ester of a hardened tallow fatty acid (1.4 mols $SO_3$ per mol of fatty acid residue; free $SO_3$ content about 8.7% by weight) was bleached for 90 minutes at 40° C. after the addition of 3% of its weight of $NaClO_2$ (in the form of a 40% aqueous solution; composition of the sulfuric acid before reaction with the bleach: 66% $SO_3$ and 34% $H_2O$; after reaction with the bleach: 62% $SO_3$ and 38% $H_2O$). The color values were: Yellow 12, red 2.9, blue 0.8.

Example 3

A sulfonation product made from hardened coconut oil (free $SO_3$ content approximately 8.4% by weight) was bleached for 90 minutes at 40° C. after the addition of 3% of its weight in $NaClO_2$ (in the form of a 40% aqueuos solution; composition of the sulfuric acid before reaction with the bleach: 65% $SO_3$ and 35% $H_2O$; after reaction with the bleach: 61% $SO_3$ and 39% $H_2O$). The color values were: Yellow 18, red 3.6, blue 1.0.

Example 4

A sulfonation product made from a mixture of hardened coconut oil and the ethyl ester of a hardened palm nut fatty acid (molar ratio 1:1 with reference to fatty acid residues; free $SO_3$ content approximately 8% by weight) was bleached for 90 minutes at 40° C. after the addition of 3% of its weight of $NaClO_2$ (in the form of a 40% aqueous solution; composition of the sulfuric acid before reaction with the bleach: 65% $SO_3$ and 35% $H_2O$). The color values were: Yellow 18, red 2.6, blue 0.

Example 5

The following studies concerning the experimental conditions to be maintained when bleaching with $NaClO_2$ were performed on the sulfonation product of an ethyl ester made from a hardened palm nut fatty acid (free $SO_3$ content approximately 7.8% by weight).

(a) How the quality of the bleach depends on the concentration of $NaClO_2$:

[Bleaching temperature, 60° C.; time, 1½ hours]

| Bleach | Composition of the sulfuric acid in the sulfonation product | | | | Color values | | |
|---|---|---|---|---|---|---|---|
| | Before reaction with the bleach | | After reaction with the bleach | | | | |
| | Percent $SO_3$ | Percent $H_2O$ | Percent $SO_3$ | Percent $H_2O$ | Yellow | Red | Blue |
| 3% $NaClO_2$ solid | | | | | 5 | 1.0 | 0.3 |
| 3% $NaClO_2$ 40% sol | 64 | 36 | 59 | 41 | 7 | 1.8 | 0.4 |
| 2% $NaClO_2$ 40% sol | 72 | 38 | 70 | 30 | 14 | 2.0 | 0 |
| 1% $NaClO_2$ 40% sol | 84 | 16 | 83 | 17 | 18 | 5.7 | 0 |

(b) How the quality of the bleach depends on temperature:

[Working conditions, 3% $NaClO_2$; time=1.5 hours]

| State of the $NaClO_2$ | Composition of the sulfuric acid in the sulfonation product | | | | Temp. ° C. | Color Values | | |
|---|---|---|---|---|---|---|---|---|
| | Before reaction with the bleach | | After reaction with the bleach | | | | | |
| | Percent $SO_3$ | Percent $H_2O$ | Percent $SO_3$ | Percent $H_2O$ | | Yellow | Red | Blue |
| 40% sol | 34 | 36 | 59 | 41 | 30 | 6 | 1.4 | 0.8 |
| Solid | | | | | 30 | 4.7 | 0.9 | 0 |
| 40% sol | 34 | 36 | 59 | 41 | 40 | 3.5 | 0.9 | 0.1 |
| Solid | | | | | 40 | 4.6 | 1.0 | 0 |
| 40% sol | 34 | 36 | 59 | 41 | 50 | 5.6 | 1.5 | 0.2 |
| Solid | | | | | 50 | 17 | 3.7 | 0 |
| 40% sol | 34 | 36 | 59 | 41 | 60 | 6.0 | 1.1 | 0 |
| Solid | | | | | 60 | 6.0 | 1.4 | 0.1 |
| 40% sol | 34 | 36 | 59 | 41 | 70 | 5.0 | 1.0 | 0.1 |
| Solid | | | | | 70 | 15 | 4.2 | 0.7 |
| 40% sol | 34 | 36 | 59 | 41 | 80 | 9.0 | 2.0 | 0.6 |
| Solid | | | | | 80 | 27.0 | 9.0 | 2.6 |

(c) How the quality of the bleach depends on time:

[($c_1$) 3%, by weight, of $NaClO_2$, solid, bleach temp., 40° C.]

| Bleaching Time | Color Values | | |
|---|---|---|---|
| | Yellow | Red | Blue |
| ½ hour | 9 | 1.1 | 0 |
| 1 hour | 6.3 | 1.0 | 0 |
| 2 hours | 4.9 | 0.8 | 0 |
| 4 hours | 6.0 | 1.1 | 0 |

[($c_2$) 3%, by weight, of $NaClO_2$, 40% aqueous solution, 40° C.]

| Bleaching time | Composition of the sulfuric acid in the sulfonation product | | | | Color values | | |
|---|---|---|---|---|---|---|---|
| | Before reaction with the bleach | | After reaction with the bleach | | | | |
| | Percent $SO_3$ | Percent $H_2O$ | Percent $SO_3$ | Percent $H_2O$ | Yellow | Red | Blue |
| ½ hour | 64 | 36 | 59 | 41 | 7 | 1.2 | 0 |
| 1 hour | 64 | 36 | 59 | 41 | 3 | 1.1 | 1.0 |
| 2 hours | 64 | 36 | 59 | 41 | 7 | 1.2 | 0 |
| 4 hours | 64 | 36 | 59 | 41 | 10 | 2.0 | 0 |

(d) How the amount of water affects the quality of the bleach:

[3% $NaClO_2$ in the form of an aqueous solution or suspension. Temperature, 40° C. Bleaching time, 90 minutes]

| Concentration of the suspension or solution | Composition of the sulfuric acid in the sulfonation product | | | | Color values | | |
|---|---|---|---|---|---|---|---|
| | Before reaction with the bleach | | After reaction with the bleach | | | | |
| | Percent $SO_3$ | Percent $H_2O$ | Percent $SO_3$ | Percent $H_2O$ | Yellow | Red | Blue |
| 80% $NaClO_2$ (suspension) | 91 | 9 | 89 | 11 | 2.0 | 0.2 | 0.1 |
| 60% $NaClO_2$ (suspension) | 80 | 20 | 77 | 23 | 2.2 | 0.2 | 0 |
| 50% $NaClO_2$ (suspension) | 72 | 28 | 68 | 32 | 4.2 | 0.8 | 0 |
| 40% $NaClO_2$ (solution) | 64 | 36 | 59 | 41 | 3.5 | 0.9 | 0.1 |
| 30% $NaClO_2$ (solution) | 53 | 47 | 48 | 52 | 7.0 | 1.3 | 0 |
| 20% $NaClO_2$ (solution) | 40 | 60 | 35 | 65 | 6.0 | 1.0 | 0 |
| 10% $NaClO_2$ (solution) | 22 | 78 | 19 | 81 | 6.0 | 1.0 | 0 |

Example 6

The starting material was the sulfonation product of a hydrated palm nut fatty acid ethyl ester ($SO_3$ content 7.8%). The bleaches listed in the table were used in quantities amounting to 3% by weight of the crude sulfonation product, in the form of 40% aqueous solutions or suspensions. The bleaching temperature was 60° C., the bleaching time one hour.

When potassium permanganate was used, manganese dioxide formed during the bleaching, whereas the chromium (III) salt which formed when chromic acid or potassium bichromate were used, was transformed with lye into the insoluble chromium hydroxide during neutralization. Both the manganese dioxide and the chromium hydroxide were filtered off after neutralization, a 5% caustic soda solution being used for better filtrability. The following results were obtained:

| Bleach | Composition of the sulfuric acid in the sulfonation product | | | | Color Values | | |
|---|---|---|---|---|---|---|---|
| | Before reaction with the bleach | | After reaction with the bleach | | | | |
| | Percent $SO_3$ | Percent $H_2O$ | Percent $SO_3$ | Percent $H_2O$ | Yellow | Red | Blue |
| $KClO_3$ | 64 | 36 | 60 | 40 | 9 | 1.5 | 0 |
| $KClO_4$ | 64 | 36 | 61 | 39 | 27 | 27 | 4.0 |
| $K_2S_2O_8$ | 64 | 36 | 61 | 39 | 27 | 6.0 | 0 |
| $KMnO_4$ | 64 | 36 | 61 | 39 | 8.0 | 1.5 | 0 |
| $CrO_3$ | 64 | 36 | 61 | 39 | 27 | 6.0 | 0.6 |
| $K_2Cr_2O_7$ | 64 | 36 | 51 | 49 | 27 | 6.0 | 0.6 |

While the invention has been described in detail with reference to certain specific embodiments, various changes and modifications which fall within the spirit of the invention will become apparent to the skilled artisan. The invention is therefore only intended to be limited by the appended claims or their equivalents wherein we have endeavored to claim all inherent novelty.

We claim:

1. Process for lightening the color of viscous and pasty dark-colored sulfonation products obtained by the alpha sulfonation of a member selected from the group consisting of substantially saturated fatty acids containing from 6 to 28 carbon atoms, their esters, and mixtures thereof, with an excess of gaseous sulfur trioxide which comprises bleaching the dark-colored sulfonation product with water containing about 20–80% of a member selected from the group consisting of chlorous acid, hypochlorous acid, chloric acid, perchloric acid, monopersulfuric acid, chromic acid, peroxydisulfuric acid, and permanganic acid, their salts and their anhydrides in amount sufficient to produce an equivalent amount of bleaching oxygen as 0.2 to 6% by weight of hydrogen peroxide at a temperature between about 20 to 100° C. until the color of the product is substantially lightened.

2. Process according to claim 1 in which said sulfonation product is a sulfonation product of an ester of a fatty acid with a lower alcohol.

3. Process according to claim 1 which includes esterifying the sulfonation product prior to said bleaching.

4. Process according to claim 1 in which said bleaching is effected at a temperature between about 40 to 60° C.

5. Process according to claim 1 in which said group member is used in an amount sufficient to produce an equivalent quantity of bleaching oxygen as 1–4% by weight of hydrogen peroxide.

6. Process according to claim 1 in which said water contains about 40 to 60% of said member of said second mentioned group.

7. Process according to claim 1 in which said second mentioned group member is used in an amount insufficient to completely bind the excess sulfonating agent.

8. Process according to claim 1 in which said bleaching is effected at a temperature of between about 40–60° C.

9. Process according to claim 1 in which said second mentioned group member is sodium chlorite.

10. Process according to claim 9 in which said water is present in an amount equal to about 4 to 0.25 times the weight of said sodium chlorite.

11. Process according to claim 10 in which said bleaching is effected for 30 to 120 minutes at a temperature between about 30–80° C.

12. Process according to claim 1 which includes esterifying the sulfonation product prior to said bleaching.

References Cited in the file of this patent

UNITED STATES PATENTS

| 1,734,050 | Seck | Nov. 5, 1929 |
| 2,460,968 | Bert et al. | Feb. 8, 1949 |
| 2,738,365 | Sylvester | Mar. 13, 1956 |
| 2,804,466 | Schurman | Aug. 27, 1957 |
| 2,846,457 | Zemlin et al. | Aug. 5, 1958 |

FOREIGN PATENTS

| 326,815 | Great Britain | Mar. 12, 1930 |